United States Patent
Swain

(10) Patent No.: US 6,268,066 B1
(45) Date of Patent: Jul. 31, 2001

(54) STRUCTURE AND PROCESS FOR AUTOMATIC WELDING STAINLESS STEEL BOXES

(76) Inventor: Loyd E. Swain, 4565 Colburn Rd., Bemus Point, NY (US) 14712

( * ) Notice: Subject to any disclaimer, the term of this patent is extended or adjusted under 35 U.S.C. 154(b) by 0 days.

(21) Appl. No.: 09/416,725

(22) Filed: Oct. 13, 1999

Related U.S. Application Data

(60) Provisional application No. 60/104,205, filed on Oct. 14, 1998.

(51) Int. Cl.[7] .............................. B23K 9/02; B23K 33/00
(52) U.S. Cl. ......................... 428/582; 428/598; 228/153; 228/164; 228/184
(58) Field of Search .................................. 428/577, 582, 428/583, 598, 595, 685; 228/141.1, 142, 153, 164, 184

(56) References Cited

U.S. PATENT DOCUMENTS

| | | | |
|---|---|---|---|
| 782,417 | * | 2/1905 | Robb ................................... 428/582 |
| 926,246 | * | 6/1909 | Dorff ................................... 428/582 |
| 3,440,711 | * | 4/1969 | Roper .................................. 228/142 |
| 3,633,786 | * | 1/1972 | Leedy ................................. 220/23.2 |
| 4,728,126 | * | 3/1988 | Sundholm ............................... 285/22 |
| 5,090,612 | * | 2/1992 | Jones ................................. 228/184 |
| 5,221,585 | * | 6/1993 | Kresse, Jr. et al. .................... 428/582 |
| 5,337,033 | * | 8/1994 | Kinouchi et al. ...................... 335/302 |
| 5,811,756 | * | 9/1998 | Horita et al. ......................... 219/137 |
| 6,060,682 | * | 5/2000 | Westbroek et al. .................... 228/153 |

FOREIGN PATENT DOCUMENTS

| | | | |
|---|---|---|---|
| 2-41718 | * | 2/1990 | (JP) ..................................... 228/142 |
| 4-237563 | * | 8/1992 | (JP) . |

* cited by examiner

Primary Examiner—John J. Zimmerman
(74) Attorney, Agent, or Firm—Lovercheck and Lovercheck

(57) ABSTRACT

A structure and a method of making a burner box by providing a U-shaped body with end members. The end members each rest on an end of the body and of the U-shape body. The ends are welded to the end members to the U-shaped body by a tungsten arc gas welding process whereby the end members are welded to the U-shape body and the edges are catalyzed in the weld. The end members overlaps the U-shape body by about half the thickness of the body to provide a filler material for the weld. A tab is integrally attached to each side of each of the end members. The tab rests on flanges and are catalyzed in the weld.

13 Claims, 4 Drawing Sheets

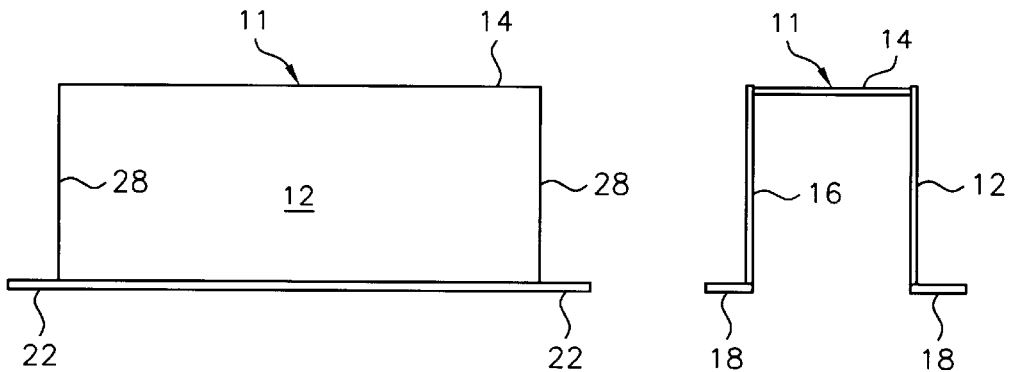
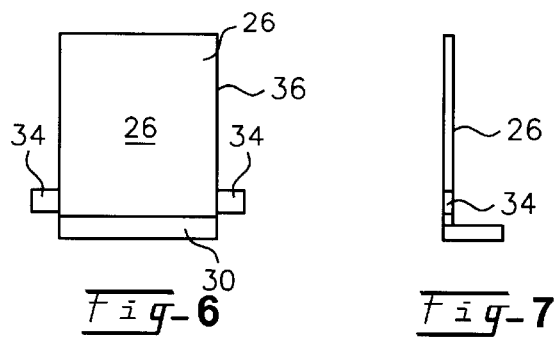
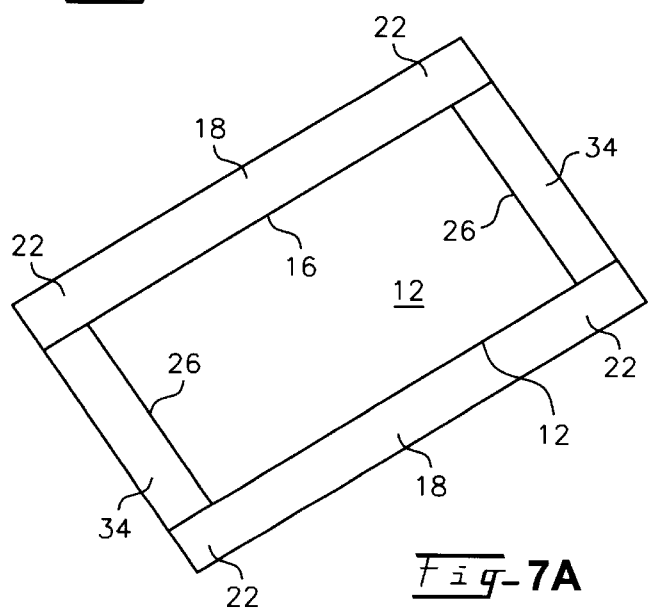

STRUCTURE AND PROCESS FOR AUTOMATIC WELDING STAINLESS STEEL BOXES

REFERENCE TO PRIOR APPLICATION

This application claims the benefit of U.S. Provisional Application Ser. No. 60/104,205 filed Oct. 14, 1998.

BACKGROUND OF THE INVENTION

This invention relates to an improved process of welding and more particularly to an improved process for making a burner box made of stainless steel.

SUMMARY OF THE INVENTION

A process for making certain stainless steel rectangular boxes with flanges is disclosed using a tungsten inert gas process. This welding process applies to all ferrous metals. The integrity of the burner box requires leak-proof construction. The burner box is rectangular with flanges and holes and two end plates, all of which are joined by the gas tungsten arc welding process. The end plates overlap the entire periphery of the ends of the body by half of the metal thickness thereby acting as a heat sink and allowing the excess (overlap) material to be melted and used as filler. Tabs are provided on end plates, which become part of the finished product, and provides additional material to be catalyzed as part of the weld in the corners where blow out generally occurs in manual welding, particularly in thin sheet materials. The tab provides positive location of the end plate.

A special high chrome content, stainless steel was developed by Allegheny-Ludlum, AL-29-4C for the purpose of withstanding and containing noxious gases created in the furnace heat exchanger.

A method is provided for welding thin sheets of stainless steel into, for example, rectangular boxes with flanges automatically welded using the tungsten arc inert gas process on relatively thin sheet metal.

An application for this method is in welding a special high chrome content, stainless steel, specifically Allegheny-Ludlum, AL-29-4C, for the purpose of withstanding and containing noxious gases created in a furnace heat exchanger. Prior to applicant's invention no one has been able to automatically weld this sheet of stainless steel into gas tight containers without blow through. This welding process is applicable to all ferrous metals. The integrity of a burner box requires leak-proof construction. The burner box disclosed herein consists of a three sided rectangle with flanges and holes and two end plates, all of which are joined by a gas tungsten arc process. The drawing suggested that manual welding would be required. Development commenced to cause the burner boxes to be manufactured with an automatic welding machine.

The blank required special tooling and design to maintain tolerances of 0.003 of an inch for all critical dimensions so that the automatic welding process could be introduced.

To provide leak-proof construction the end plate was designed to overlap the entire periphery of the part body by one half of the metal thickness thereby acting as a heat sink and allowing the excess overlap material to be used as filler. The corners present a particularly difficult problem. At each corner a tab is designed and cut as part of the end plate in the finished product, which allows additional material to be integrated as part of the weld in the corners where blow out generally occurs in manual welding. The tab provides positive location of the end plate. Without the design of the blank and holding its tolerances, manual welding would be required.

Special tooling has been designed and installed on a commercial automatic welding machine. A special software program may be created to cause the machine to weld in the right places. The tooling contains a fixture, which requires a positive dimensional check on the blank. The end plate is inserted on the top of the blank, centered by the fixture and welded automatically. The piece may be turned upside down on a second fixture so that the other end plate may be attached.

It is an object of the present invention to provide an improved structure of a box.

It is another object of the present invention to provide an improved method of making a box.

It is another object of the present invention to provide a box that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that the changes may be made in the form, size, proportions and minor details of construction without departing from the spirit or sacrificing any of the advantages of the invention.

BRIEF DESCRIPTION OF THE DRAWINGS

FIG. 4 is a side view of one of the sides of the burner box.

FIG. 5 is an end view of the sides, top and flanges of the burner box.

FIG. 6 is an end view of an end of the burner box.

FIG. 7 is an end view of the end plate as shown in FIG. 6 with outwardly extending flange at its lower end and tab above the flange and extending outwardly from the edge of the end plate.

FIG. 7A is a top view of FIG. 4 according to the invention.

DESCRIPTION OF THE PREFERRED EMBODIMENT

Figure 1:
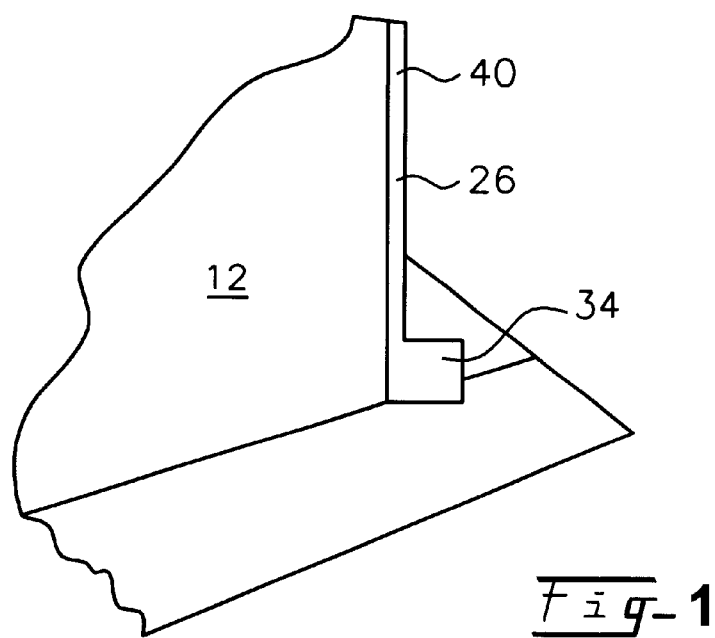
FIG. 1 is an enlarged partial view of the tab and overlap at the corner to be joined prior to assembly by welding.
Figure 2:
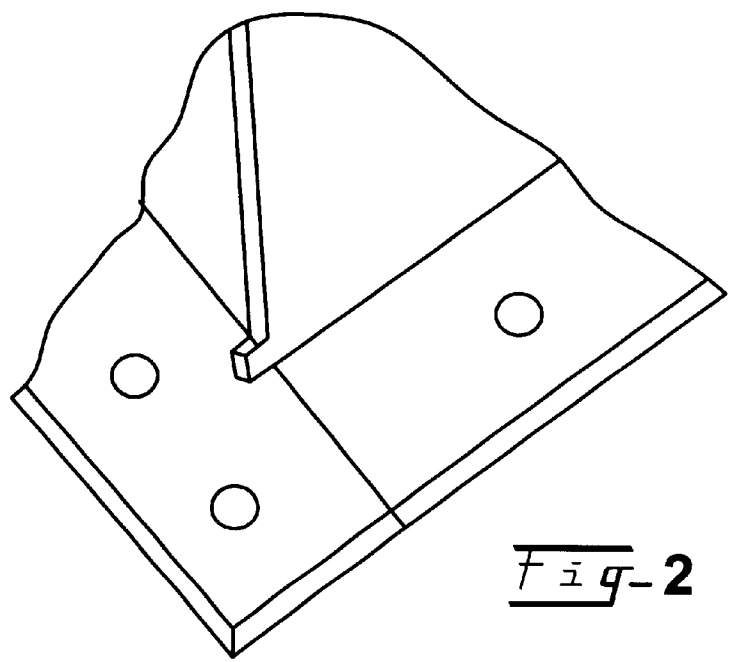
FIG. 2 is an enlarged partial view the tab and overlap shown from the side opposite the side shown in FIG. 1 of the corner to be joined prior to assembly by welding.
Figure 3:
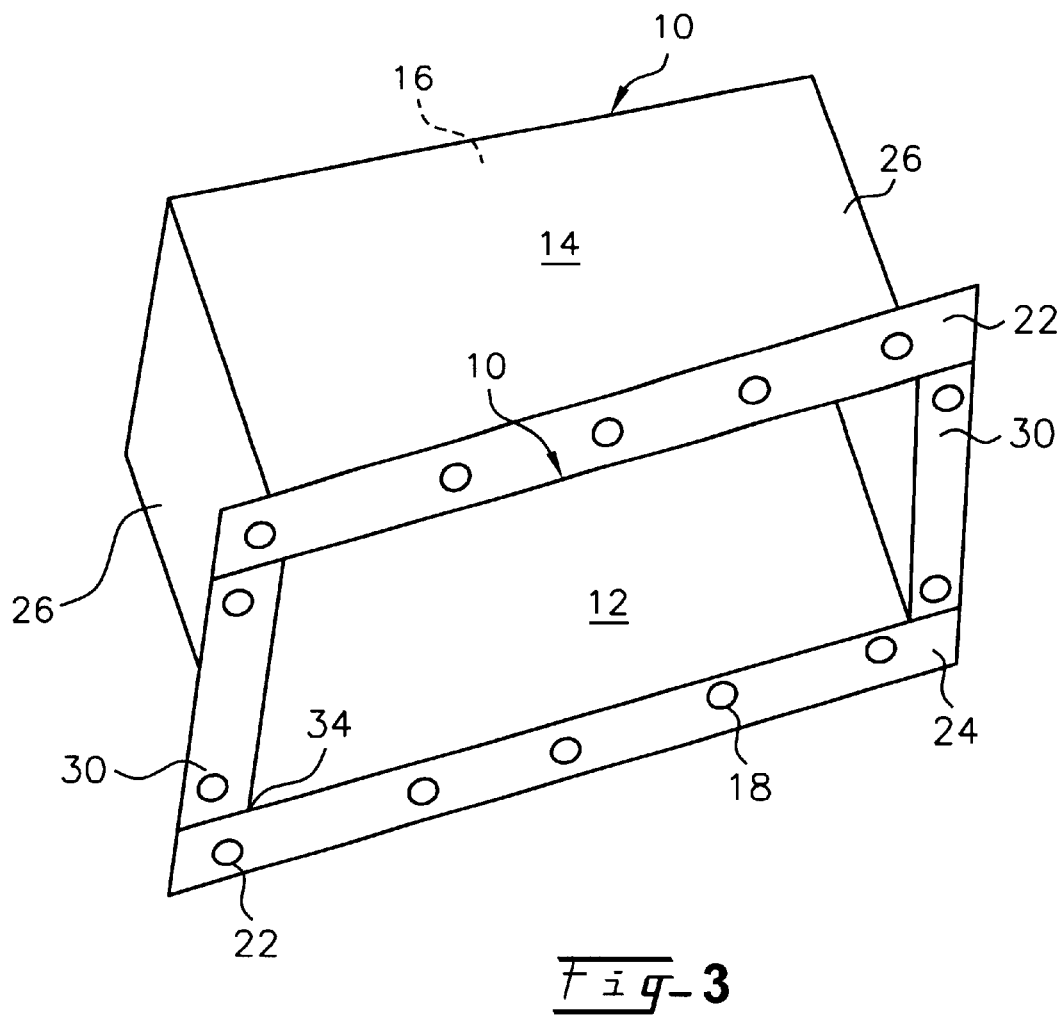
FIG. 3 is an isometric view of the burner box looking into the bottom of the box according to the invention.
Figure 8:
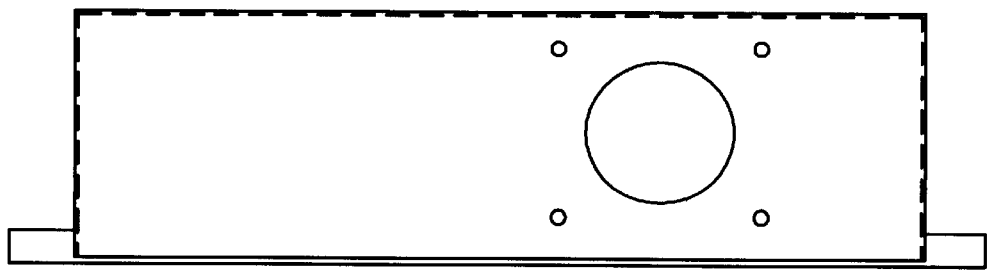
FIG. 8 is a side view of the side opposite FIG. 4 according to the invention.
Figure 9:
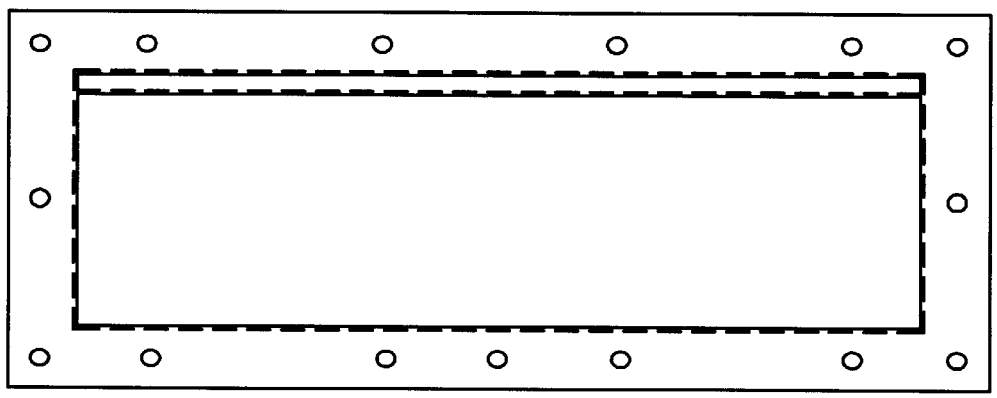
FIG. 9 is a bottom view showing the outwardly extending flange according to the invention.
Figure 10:
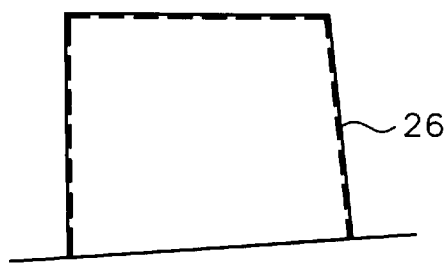
FIG. 10 is an end view showing one of the end plates.

Now with more particular reference to the drawings, shown is burner box 10 having side members 12,16, top 14 and flanges 18 integrally attached to side members 12,16 and extending outward. Top 14 is integrally attached to side members 12,16. Flanges 18 are integrally attached to side members 12,16 and extend outwardly therefrom.

Flange extensions 22 are integrally attached to each end of flanges 18. End members 26 each have outwardly directed flange 30 attached thereto. Tabs 34 are integrally attached to square end members 26.

Generally U-shaped body 11 with flanges 18 are attached to side members 12,16. Square end members 26 are attached to each end of U-shaped body 11. Each flange 18 has an extension on each end extending beyond side members 12,16. Tab 34 is integrally attached to each side of end members 26 and tabs 34 overlay flanges 18 and position ends on side members 12,16.

Burner box 10 is assembled by supporting square end member 26 over each end of U-shaped body 11 with tabs 34 resting on flange extension 22. Square end members 26 are wide enough that their edge overlay 40 the ends of side members 12,16 by half of the thickness of square end members 26. Square end members 26 are welded to side members 12,16. Square end members 26 overlay the ends of side members 12,16 half the thickness of the metal of side members 12,16 to be used as a filler in the weld. Tabs 34 catalyze with the material of end members 26 and side members 12,16 at the end of the weld providing gas type containers without flow through and without leakage.

The foregoing specification sets forth the invention in its preferred, practical forms, but the structure shown in capable of modification within a range of equivalents without departing from the invention which is to be understood is broadly novel as is commensurate with the appended claims.

The embodiments of the invention in which an exclusive property or privilege is claimed are defined as follows:

1. A method of welding a first plate to a second plate comprising the steps of:

placing said first plate on an edge of said second plate;

overlapping said edge of said second plate with said first plate by half the thickness of said second plate;

providing a tab on an edge of said first plate adjacent said edge of said second plate;

welding said first plate to said second plate by a gas tungsten arc process whereby said tab and said overlap is catalyzed into said weld along the edge of said second plate.

2. The method of claim 1 wherein said plates are thin sheets of stainless steel.

3. The method of claim 1 wherein said first plate overlaps the entire edge of said second plate by half of said material thickness.

4. The method of claim 1 wherein said welding is done automatically.

5. A box comprising a U-shaped body configuration having a bottom and sides;

an outwardly extending flange extension attached to the distal ends of each of said sides;

a generally square end plate supported on each end of said body configuration;

each said end having an outwardly extending tab integrally attached to the lower portion of each edge;

said tabs resting on said extension of said flange for supporting said ends in place whereby when said ends are welded to said sides by a tungsten gas process said tabs are melted and catalyzed with said joints.

6. The box recited in claim 5 wherein said plates are thin sheets of stainless steel.

7. The box recited in claim 5 wherein said end plates overlap the entire periphery of said ends of said body by half of said material thickness.

8. The box recited in claim 5 wherein said plates are welded automatically.

9. A method of making a stainless steel box comprising:

providing a U-shaped body having a bottom and two side plates;

providing end plates overlying each end of said side plates of said U-shaped body by about half of the thickness of said side plates;

providing outwardly extending flanges on each said side plate, said flange extending beyond each end of said body;

providing a flange on the lower edge of each end plate disposed between said extensions of said side plate flanges;

welding said end plates to said side plates of said body by an automatic tungsten gas process.

10. The method recited in claim 9 further comprising the step of:

providing outwardly extending tabs at each lower corner of each end plate, said tabs resting on said side plate flanges whereby when the side plates and end plates are welded the tabs are melted and fill the corners.

11. The method recited in claim 9 wherein said plates are thin sheets of stainless steel.

12. The method recited in claim 9 wherein said end plates overlap the entire periphery of said ends of said body by half of said material thickness.

13. The method recited in claim 9 wherein said welding is done automatically.

* * * * *